(12) United States Patent  
Kato

(10) Patent No.: US 8,412,476 B2
(45) Date of Patent: Apr. 2, 2013

(54) TRAVEL SUPPORT SYSTEM, METHOD, AND PROGRAM

(75) Inventor: Kazuya Kato, Okazaki (JP)

(73) Assignee: Aisin AW Co., Ltd. (JP)

( * ) Notice: Subject to any disclaimer, the term of this patent is extended or adjusted under 35 U.S.C. 154(b) by 567 days.

(21) Appl. No.: 12/613,778

(22) Filed: Nov. 6, 2009

(65) Prior Publication Data

US 2010/0121590 A1 May 13, 2010

(30) Foreign Application Priority Data

Nov. 11, 2008 (JP) ................................ 2008-288457

(51) Int. Cl.
*G01R 31/36* (2006.01)
*H02J 7/00* (2006.01)
*B60W 10/24* (2006.01)
*B60L 9/00* (2006.01)

(52) U.S. Cl. .......... 702/63; 320/112; 180/65.29; 701/22

(58) Field of Classification Search .................. 702/63, 702/57, 60, 64–65, 81, 84, 127, 182–183, 702/189; 320/104, 112, 128, 132, 134, 136, 320/149, 151–152, 156–157, 162; 180/65.285, 180/65.29, 65.31; 701/22
See application file for complete search history.

(56) References Cited

U.S. PATENT DOCUMENTS

| 5,892,346 A | * | 4/1999 | Moroto et al. ................ 318/587 |
| 2002/0188387 A1 | | 12/2002 | Woestman et al. |
| 2006/0142915 A1 | | 6/2006 | Isono et al. |
| 2007/0193792 A1 | | 8/2007 | Yamaguchi et al. |
| 2008/0032162 A1 | * | 2/2008 | Hirakata ......................... 429/13 |

FOREIGN PATENT DOCUMENTS

| DE | 102008021045 | 10/2008 |
| EP | 1935712 | 6/2008 |
| JP | 06189402 A | 7/1994 |
| JP | 07031008 A | 1/1995 |
| JP | 2003246246 A | 9/2003 |
| JP | 2008-120333 | 5/2008 |
| JP | 2008265594 A | 11/2008 |

\* cited by examiner

*Primary Examiner* — Toan Le
(74) *Attorney, Agent, or Firm* — Bacon & Thomas, PLLC

(57) ABSTRACT

A travel support system for a vehicle includes: a required power amount obtaining unit determining a required power amount in a rechargeable battery required for travel of a predetermined section of a route; a remaining power amount obtaining unit determining a remaining power amount as the amount of power currently remaining in the rechargeable battery; an excess power amount obtaining unit determining an excess power amount as a portion of the remaining power amount in the rechargeable battery in excess of the required power amount; and a communication unit notifying a user of the vehicle of information indicating the availability of an electrical component of the vehicle in traveling the predetermined section, based on the excess power amount.

20 Claims, 5 Drawing Sheets

FIG. 5A

AVAILABILITY INFORMATION

| PRIORITY | | AVAILABILITY |
|---|---|---|
| 1 | AIR CONDITIONER | AVAILABLE |
| 2 | AUDIO UNIT | AVAILABLE |
| 3 | COOL BOX | UNAVAILABLE |

FIG. 5B

AVAILABILITY INFORMATION

AIR CONDITIONER, AUDIO UNIT

COOL BOX, AUDIO UNIT

AIR CONDITIONER, AUDIO UNIT, COOL BOX

TRAVEL SUPPORT SYSTEM, METHOD, AND PROGRAM

INCORPORATION BY REFERENCE

The disclosure of Japanese Patent Application No. 2008-288457 filed on Nov. 11, 2008 including the specification, drawings and abstract is incorporated herein by reference in its entirety.

BACKGROUND OF THE INVENTION

The present invention relates to a travel support system, method, and program for a vehicle having a rechargeable battery.

DESCRIPTION OF THE RELATED ART

In late years, there has been developed a vehicle capable of traveling using electric power stored in a rechargeable battery. The amount of power remaining in the rechargeable battery can be determined as a state of charge (SOC), but it is difficult to directly learn how far the vehicle can be driven using this remaining power amount. Accordingly, a technique has been developed to estimate a travelable distance in an EV mode based on the remaining power amount (SOC). See, for example, Japanese Patent Application Publication No. 2008-120333.

SUMMARY OF THE INVENTION

In Japanese Patent Application Publication No. 2008-120333, the travelable distance is determined based on the current remaining power amount in the rechargeable battery, and thus certain criteria can be provided for driving the vehicle thereafter. However, use of electrical auxiliary equipment, such as an air conditioner driven by consuming power in the rechargeable battery, is not considered in determining the travelable distance in Japanese Patent Application Publication No. 2008-120333. Therefore, when traveling to a predetermined point (or a section in advance of the predetermined point), the user of the vehicle is unable to recognize the availability of electrical components which will consume to some extent the amount of power remaining in the rechargeable battery.

The present invention is made in view of the above problem, and an object thereof is to provide a technique for allowing recognition of whether or not a section of the route can be traveled while using one or more electrical components.

To achieve the above-described object, according to a first aspect of the present invention, an excess amount of power in a rechargeable battery for travel of a predetermined section is obtained based on an amount of power required for travel of the predetermined section and a current amount of power remaining in a rechargeable battery, and information indicating the availability of an auxiliary electrical device (electrical component) of the vehicle while traveling the predetermined section, is determined based on the amount of excess power and communicated to the user. Therefore, based on the communicated availability information, the user can recognize whether or not the auxiliary electrical devices are available (may be operated) while traveling the predetermined section utilizing the power remaining in the rechargeable battery.

A required power amount obtaining unit determines the amount of power required for traveling a predetermined section in the vehicle, i.e. the amount of electric power required for operation of the drive source of the vehicle in travel of the predetermined section, excluding power not contributing to operation of the drive source of the vehicle (it is possible for the vehicle to complete travel of the predetermined section without consuming this power), thus serving as means for determining the required power amount. For example, the rotational speed and torque of the transmission shaft of the vehicle may be obtained by actual measurement or estimation, and used to calculate the required amount of power. Alternatively, the required amount of power may be calculated based on parameters such as a vehicle speed, gradients on the route to be traveled and the weight of the vehicle. The predetermined section may be any section between two arbitrary points which the vehicle may travel, for example, a route from the current location of the vehicle to a destination, or a section (link or the like) set between two arbitrary points in that route.

A remaining power amount obtaining unit determines the current amount of power remaining in the rechargeable battery, thus serving as means for determining the remaining power amount. Various parameters (SOC, voltage, current, pH of electrolyte layer, and the like) related to the rechargeable battery may be used to represent the remaining power amount.

An excess power amount obtaining unit determines the excess power amount in the rechargeable battery, i.e. remaining power in excess of the amount required to power travel of the predetermined section, thus serving as means for determining the excess power amount. Specifically, the unit determines the amount of available (remaining) power in excess of that amount of electric power required to power the drive source to an extent sufficient for the vehicle to travel the predetermined section. Therefore, the excess power corresponds to the remaining power amount minus the required power amount. However, when there is a lower limit value for the amount of power remaining in the rechargeable battery, the excess power amount is the remaining power amount minus the required power amount minus the lower limit value. Of course, when the remaining power amount is increased by regeneration in a hybrid vehicle or the like, the power amount to be obtained by regeneration while traveling the predetermined section may be estimated and added to the remaining power amount or to the excess power amount.

The communication (notification) unit determines the availability of the auxiliary electrical devices (electrical components) while traveling the predetermined section, based on the amount of excess power, and notifies the user of the availability information, thus serving as means for notifying a user of availability of various electrical components for operation while traveling the predetermined route. The availability information indicates, directly or indirectly, whether at least one of the auxiliary electrical devices is available or unavailable for use while traveling a predetermined section in the vehicle. For example, it is possible to identify an auxiliary electrical device, among those mounted in the vehicle, that is available, based on the amount of excess power, and to communicate the name and the available time of that device to the user. Of course, the user may be notified of the name of an electrical device which is unavailable or notified of the unavailable time (the time interval during which the electrical device should not be used while traveling).

The availability information pertains to travel of a predetermined section or route in the vehicle, and thus is related to this predetermined section. Therefore, the availability information may be communicated in association with a predetermined section. For example, the user may be notified that travel of the predetermined section may be completed with consumption of the amount of power currently remaining in the rechargeable battery when a specific electrical component (device) is not used while traveling within the predetermined section, or that the current remaining amount of power in the rechargeable battery will not be sufficient to complete travel if a specific electrical component is used in the predetermined section.

Alternatively, the information communicated to the user may indirectly show the availability of an electrical component by illustrating predicted consumption of the excess power amount. For example, the power consumption of an arbitrary electrical component can be determined based on specifications, actual measurement, or the like. Based on the power consumption, it is possible to determine the amount of power consumption when a currently used electrical component continues to be used from the present moment. Further, the amount of power required for driving the vehicle is not included in the excess power amount, and thus a predicted schedule of consumption of the excess power can be determined by subtracting the amount of power which will have been consumed by the electrical component, at various points in time in the future, from the excess power amount. Accordingly, when the predicted schedule of consumption of this excess power amount is displayed (see, for example, FIG. 4B), the user can recognize when the amount of excess power will become insufficient as the currently used electrical component continues to be operated. In this manner, the availability of this electrical component while traveling a predetermined section can be introduced indirectly.

Alternatively, the system may be adapted to notify the user of an electrical component which can continue to be operated, powered by the excess power amount, during travel of the predetermined section. With this arrangement, it is possible to clearly show the user an electrical component available for use during travel of the predetermined section, i.e. the travel of the predetermined section can be completed while continuously operating this component.

Priority may be assigned to the various electrical components in advance, or to a combination of the electrical components, in order from the electrical component or combination with highest priority. For a combination of electrical components, the user is notified whether or not all the electrical components included in the combination can be operated continuously on the excess power. With this arrangement, it is possible to clearly show the user how many electrical components, in order of priority, can be driven by the excess power when traveling a predetermined section. The priority may be determined in advance, for example, by the user, or priority may be based on frequency of use. The priority may be defined in advance to vary depending on the season, time, or the like (such that the air conditioner is given highest priority in summer).

It is also possible for the user to select a combination of a plurality of electrical components, for notification of their availability while traveling a predetermined section. Specifically, the system may be designed to accept selection of arbitrary electrical components by the user, and to notify the user that all the electrical components included in the accepted combination are available while traveling a predetermined section, a part thereof is available or unavailable, or the like. This arrangement enables the user to select an available electrical component while traveling the predetermined section.

The present invention, which notifies the user with information indicating the availability of the electrical components of a vehicle while traveling a predetermined section, based on the amount of excess power in the rechargeable battery, may also be embodied as a program or a processing method. Further, the travel support system, method, and program as described above may be embodied as a single apparatus, using parts in common with other units in the vehicle, or may be utilized in cooperation with parts which are not mounted in the vehicle. Further, changes can be made as appropriate, as between a portion which is software and another portion which is hardware. Furthermore, the invention may also be embodied as a computer-readable storage medium encoded with a program controlling the travel support system. Of course, the storage medium encoded with this software may be a magnetic recording medium or a magneto-optical recording medium. Any kind of recording medium developed in the future can also be used exactly in the same manner.

BRIEF DESCRIPTION OF THE DRAWINGS

FIGS. 5A and 5B are examples of additional displays for notifying the driver of availability of power for operation of auxiliary electrical devices.

DESCRIPTION OF THE PREFERRED EMBODIMENTS

Figure 1:
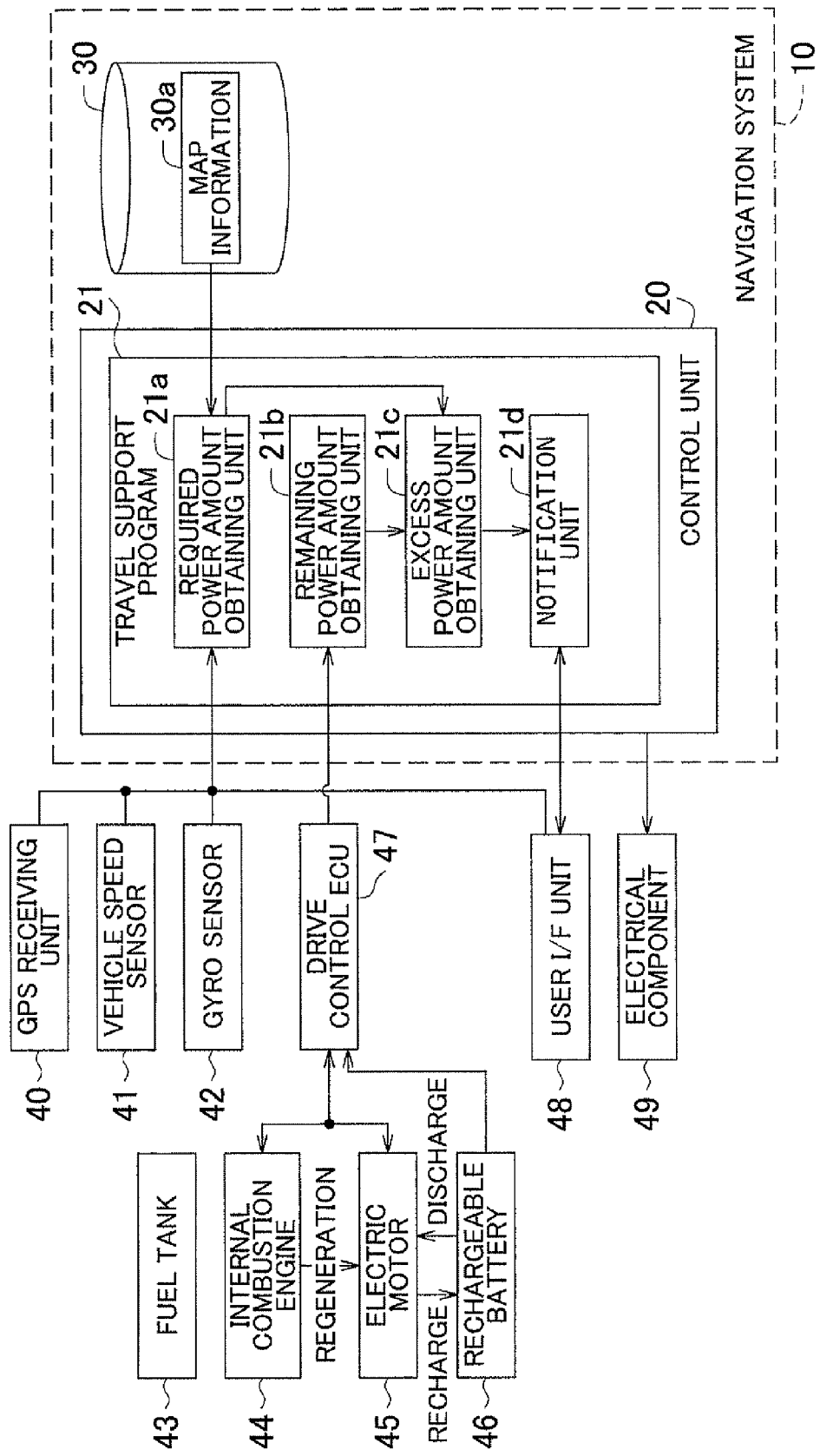
FIG. 1 is a block diagram of an embodiment of a travel support system in accordance with the present invention.

Embodiments of the present invention will now be described in the following order.
(1) The structure of a travel support system
(2) Travel support processing
(3) Other embodiments (1) The Structure of a Travel Support System FIG. 1 is a block diagram showing the structure of a preferred embodiment of a travel support system mounted in a vehicle. The travel support system in this embodiment is incorporated into a navigation system 10. The navigation system 10 includes a control unit 20 having a CPU 21, a RAM, a ROM, and so on, and a storage medium 30, and programs stored in the storage medium 30 or the ROM which can be executed by the CPU 21. In this embodiment, a travel support program (FIG. 2) is included as one of the programs which can be executed.

A global positioning system (GPS) receiving unit 40 receives radio waves from a GPS satellite and outputs a signal for calculating the current location of the vehicle and a signal indicating the current time via an interface (not shown). The control unit 20 receives these signals and obtains the current location of the vehicle and the current time. A vehicle speed sensor 41 outputs a signal corresponding to the rotational speed of wheels of the vehicle. The control unit 20 obtains this signal via an interface (not shown) and obtains the speed of the vehicle. A gyro sensor 42 detects the angular acceleration in turning of the vehicle within a horizontal plane, and outputs a signal corresponding to the direction of the vehicle. The control unit 20 obtains this signal via the interface (not shown) and obtains the traveling direction of the vehicle. The vehicle speed sensor 41 and the gyro sensor 42 are used for correcting the current location of the vehicle determined from the output signal of the GPS receiving unit 40. The control unit 20 corrects the current location of the vehicle as appropriate by checking with map information 30a, which will be described later.

The vehicle in this embodiment is a hybrid vehicle having, as drive sources, an internal combustion engine 44 whose power source is fuel stored in a fuel tank 43, and an electric motor 45 whose power source is a rechargeable battery 46. The internal combustion engine 44 and the electric motor 45 are coupled to a power transmission mechanism (not shown). By converting rotational driving force into driving force of the vehicle by the power transmission mechanism, the vehicle is driven. The vehicle is capable of being driven by either or both of the internal combustion engine 44 and the electric motor 45. Further, a part of the rotational driving force generated by the internal combustion engine 44 is transferred to the electric motor 45 as regenerated energy. When this happens, the electric power generated by the electric motor 45 (operating as a generator) is stored in the rechargeable battery 46.

The internal combustion engine 44 and the electric motor 45 are controlled by a drive control ECU 47. The drive control ECU 47 outputs control signals to the internal combustion engine 44 and the electric motor 45 for controlling either or both of the internal combustion engine 44 and the electric motor 45 to generate rotational driving force. Therefore, in this embodiment, driving or stopping the internal combustion engine 44, charging by the electric motor 45, or driving the electric motor 45 by discharge of the rechargeable battery 46 are selected by the control signals outputted by the drive control ECU 47. Further, the drive control ECU 47 obtains a remaining power amount [%] (SOC: State Of Charge) from the rechargeable battery 46 and notifies the control unit 20 of the remaining power amount.

A user I/F unit 48 is an interface unit for inputting an instruction by the user and providing the user with various information, and includes a touch panel display, a switch, a speaker, and so on which are not shown. The user can operate this user I/F unit 48 so as to set a destination in the navigation system 1. Further, the control unit 20 notifies the user of information indicating the availability of the auxiliary electrical devices in the vehicle (electrical components) to the user I/F unit 48. An auxiliary electrical device (electrical component) 49 is equipment driven by electric power stored in the rechargeable battery 46 and, in this embodiment, includes an audio unit (electrical component 1), a cool box (electrical component 2), and an air conditioner (electrical component 3). Further, the control unit 20 is capable of controlling the auxiliary electrical device 49 via an interface (not shown), and can identify the state of use thereof.

By executing the travel support program, the CPU 21, processes information for notification of the availability of the auxiliary electrical devices of the vehicle while traveling a predetermined section. For this purpose, in executing the travel support program, the CPU 21 functions as a required power amount obtaining unit 21a, a remaining power amount obtaining unit 21b, an excess power amount obtaining unit 21c, and a notification unit 21d. In the storage medium 30, map information 30a is stored in advance. The map information 30a includes node data indicating nodes set on a road which the vehicle travels, shape interpolation point data for identifying the shape of a road link between nodes, link data indicating coupling of nodes to each other, gradient data indicating gradients of roads, gradient change point data representing points where a gradient changes, data indicating features existing on a road and in the vicinity thereof, and so on. The map information is used for searching for a route to a destination (in this embodiment, a section from the current location to a destination corresponds to the predetermined section) from the current location of the vehicle, and for providing route guidance or the like.

The required power amount obtaining unit 21a is a module by which the control unit 20 obtains a required power amount needed for traveling a predetermined section in the vehicle. That is, the control unit 20 identifies the current location of the vehicle based on output signals of the GPS receiving unit 40, the vehicle speed sensor 41, the gyro sensor 42, and the like, and identifies a destination based on input by the user through the user I/F unit 48. Then the control unit 20 performs a route search for a guidance route from the current location to the destination based on the map information 30a, and identifies a route from the current location to the destination (a predetermined section). Incidentally, the route may be changed according to change in the current location of the vehicle.

Furthermore, the control unit 20 obtains the gradient of each road section forming the route from the map information 30a, predicts the vehicle speed for when the vehicle travels the road section, and obtains the energy required for traveling the road section with this gradient at the predicted vehicle speed. Then the control unit obtains the amount of power required of the rechargeable battery 46 for driving the electric motor 45 traveling in EV mode. Further, the control unit adds up the obtained amounts of power required for travel of all the road sections, and thereby obtains a total required amount of power required for traveling a route from the current location to the destination using the rechargeable battery 46 as the power source.

The remaining power amount obtaining unit 21b is a module by which the control unit 20 functions to obtain the amount power (SOC) remaining in the rechargeable battery 46.

The excess power amount obtaining unit 21c is a module by which the control unit 20 obtains an excess amount of power in the rechargeable battery 46 in travel of the route from the current location to the destination, based on the required amount of power and the remaining amount of power. Incidentally, a lower limit is set for the power remaining in the rechargeable battery 46 in this embodiment. Thus, the excess amount of power in the rechargeable battery 46 is obtained for using the rechargeable battery 46 in a manner whereby the remaining amount of power in the rechargeable battery 46 stays higher than the lower limit value.

The notification (communication) unit 21d is a module by which the control unit 20 gives the user information indicating the availability of the auxiliary electrical device 49 while traveling the route from the current location to the destination, based on the excess amount of power. That is, the control unit 20 identifies the power consumption of the auxiliary electrical device 49, and determines whether or not available (excess) electric power is sufficient for continuous operation of the auxiliary electrical device 49 while traveling the route from the current location to the destination. Then the control unit outputs a control signal to the user I/F unit 48 for outputting information indicating the availability of the auxiliary electrical device 49. As a consequence, the user can recognize whether or not it is possible to travel the predetermined section, powered by the rechargeable battery 46, while operating the auxiliary electrical device 49.

(2) Travel Support Processing

Next, execution of the travel support method by the navigation system 10 having the above structure will be described.

Figure 2:
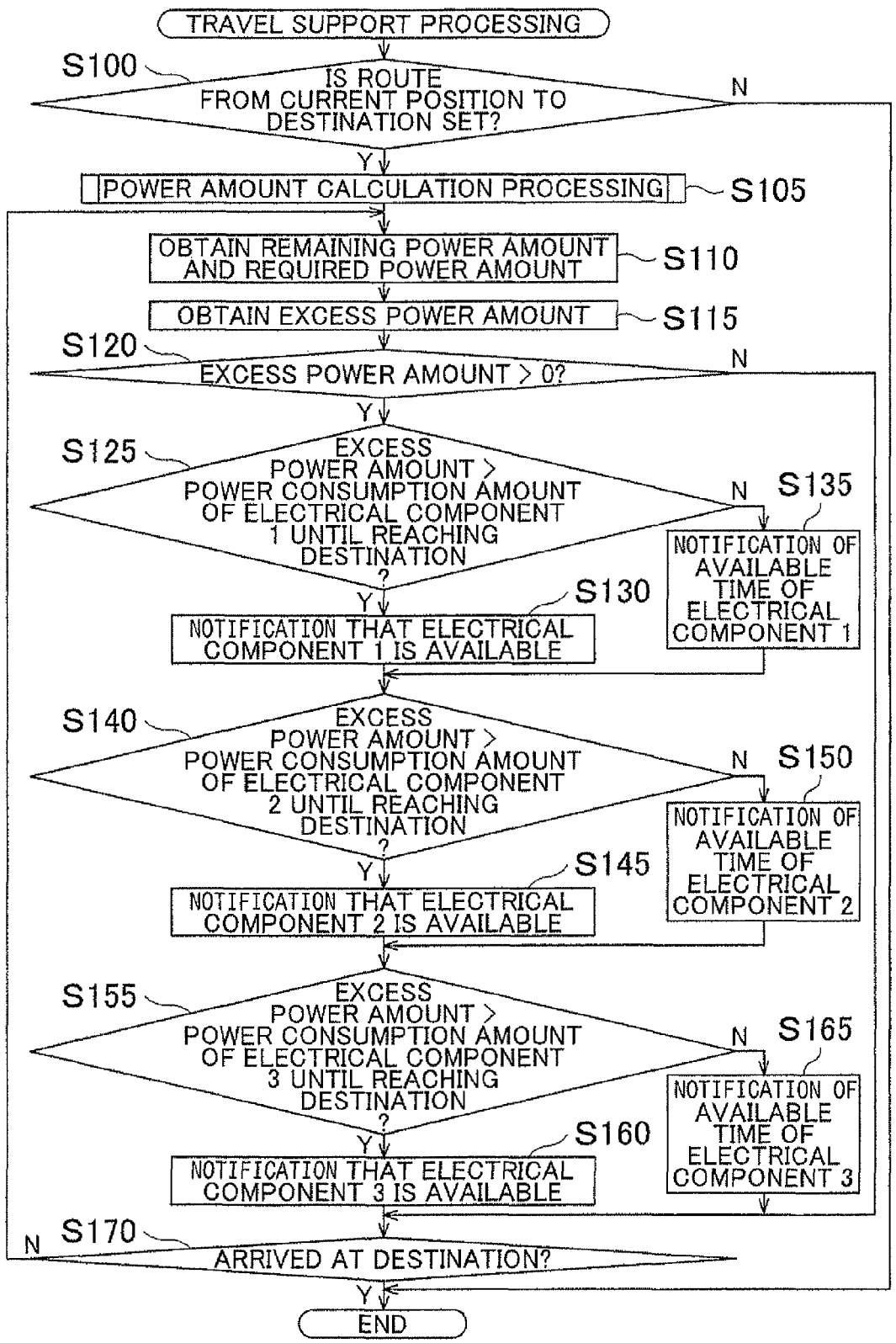
FIG. 2 is a flowchart of an embodiment of a travel support process in accordance with the present invention.

FIG. 2 is a flowchart showing the travel support method. First, the control unit 20 determines whether or not a route from the current location to a destination has been set, utilizing the required power amount obtaining unit 21a (S100). When it is determined in S100 that a route is not set, the steps in S105 and thereafter are skipped.

Figure 3:
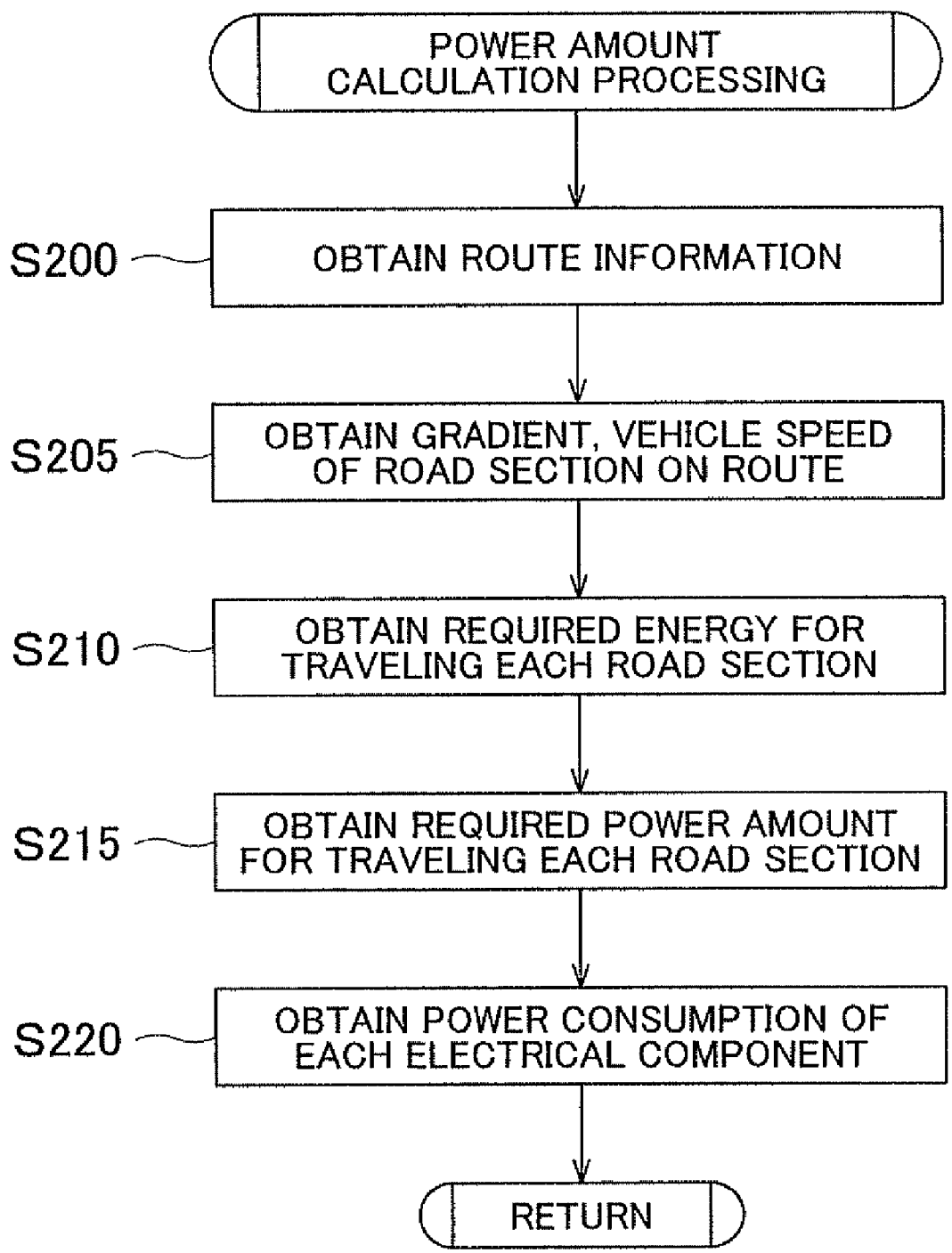
FIG. 3 is a flowchart of an embodiment of a process for calculating the remaining amount of power in accordance with the present invention.

When it is determined in S100 that a route has been set, the control unit 20, by operation of the required power amount obtaining unit 21a, executes a calculation routine to calculate the amount of power required for travel of each road section based on relevant route information (S105), FIG. 3 is a flowchart of a routine for calculating the required power amount. In executing the power amount calculation processing, the control unit 20 obtains route information indicating the route from the current location to the destination (S200), identifies road sections forming this route, and obtains the gradient of each road section and a predicted speed of the vehicle in each road section (S205).

Furthermore, the control unit 20 determines the required energy for travel of each road section (S210). Specifically, the control unit 20 obtains the weight of the vehicle and the gradient of each road section, and then calculates amount of energy required for moving an object with the same weight as the vehicle, at the same speed as the predicted vehicle speed, for each road section utilizing a known motion equation. Then, the control unit obtains the amount of power required of the rechargeable battery 46 for output of the calculated required amount of energy, based on the energy conversion efficiency of the vehicle (S215). Through the above processing, the amount of power required for travel of each road section is determined.

Further, the control unit 20 obtains the power consumption of each auxiliary electrical device which is determined in advance based on the specifications or the like (S220). In addition, in this embodiment, since there are three electrical devices (electrical components) 49, power consumption is obtained for each of the three electrical components in S220.

Next, the control unit 20 returns to the flowchart shown in FIG. 2, and obtains the amount of power remaining in the rechargeable battery 46 and the amount of power required for traveling the route from the current location to the destination (S110). That is, the control unit 20 obtains the amount of power remaining in the rechargeable battery 46 output by the drive control ECU 47, and obtains a cumulative value for the amount of power required for travel of all road sections determined in S215, which is the required amount of power for traveling the route from the current location to the destination.

The control unit 20 also obtains the amount of excess power (S115). That is, the control unit 20 obtains the lower limit for power (charge) remaining in the rechargeable battery 46, and identifies the excess power amount as "excess power amount=remaining power amount−required power amount for traveling the route from the current location to the destination−lower limit for power in the rechargeable battery 46". Then the control unit 20 determines whether or not the excess power amount is larger than 0 (zero) (S120). When it is determined in S120 that the excess power amount is not larger than 0 (zero), steps S125 and those following are skipped.

When it is determined in S120 that the amount of excess power is larger than 0, the control unit 20 determines whether or not the excess power amount is larger than the amount of power which will be consumed by the electrical component 1 in completing travel to the destination (S125). That is, the control unit 20 calculates the power consumption amount to be used if the electrical component 1 is continuously used from the current location to the destination, based on the power consumption of the electrical component 1 obtained in S220. The control unit then determines whether or not the excess power amount is larger than the power consumption amount of the electrical component 1.

When it is determined in S125 that the excess power amount is larger than the power consumption amount of the electrical component 1 in continuous operation to the destination, it means that the electrical component 1 can continue to be operated while the vehicle travels to the destination under power of the rechargeable battery 46 alone. Then the control unit 20 notifies the user that the electrical component 1 is available (S130). On the other hand, when it is determined in S125 that the excess power amount is not larger than the power consumption amount of the electrical component 1 in use continuously to the destination, it means that, if operation of the electrical component 1 is continued until reaching the destination, the vehicle cannot travel to the destination using only the power of the rechargeable battery 46 (the travel cannot be completed in the EV mode).

Accordingly, the control unit 20 notifies the user of the available time for operation of the electrical component 1 (S135). That is, the control unit 20 obtains available time T as the excess power amount=the power consumption of the electrical component 1×time and notifies the user of the available time T. Of course, with notification of T, the control unit may also inform the user that the electrical component 1 is not available so as to clearly notify the user that the vehicle cannot travel to the destination on the power of the rechargeable battery 46 if the electrical component 1 continues to be operated until reaching the destination.

In this embodiment, for the electrical component 2 and the electrical component 3, the amounts of power to be consumed by the electrical components 2, 3 in travel to the destination are each compared with the excess power amount by the same processing, and information indicating the availability of the electrical components 2, 3 is communicated to the user (the electrical component 2: S S140 to S150; the electrical component 3: S S155 to S165). Then the control unit 20 determines whether or not the vehicle has arrived at the destination (S170), and repeats steps S110 to end until it is determined that the vehicle has arrived at the destination.

Figures 4A, 4B:
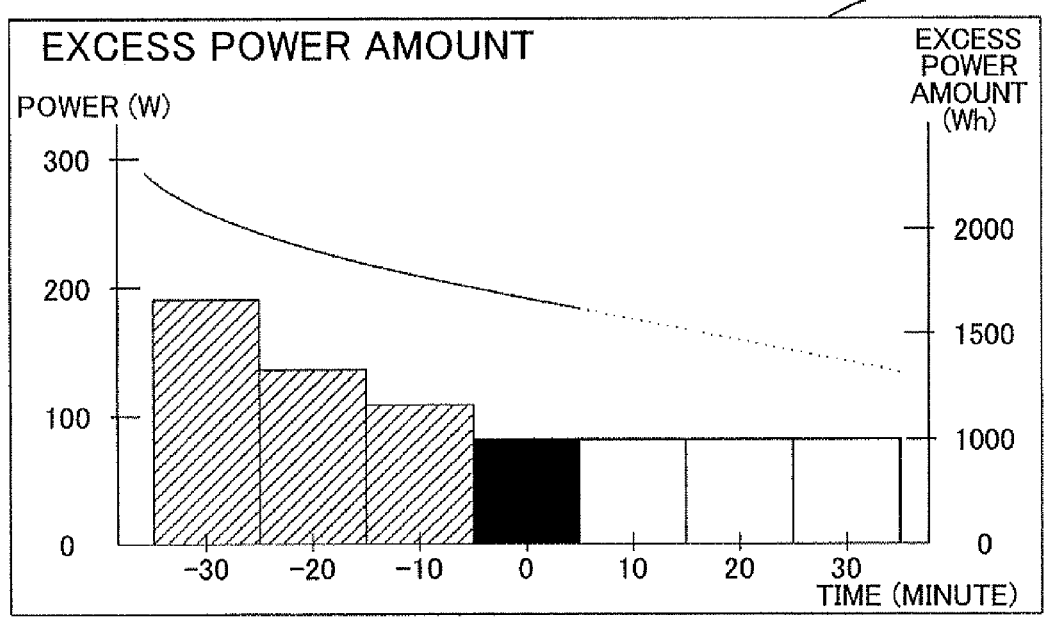
FIGS. 4A and 4B are examples of different displays for notifying the driver of power available for operation of auxiliary electrical devices.

FIG. 4A is a diagram showing an example of notification generated by execution of S125 to S160. FIG. 4A illustrates a screen 48a displayed in a display portion of the user I/F unit 48. In this screen 48a, the names of the electrical components 1 to 3 (in this example, the electrical component 1 is an audio unit, the electrical component 2 is a cool box, and the electrical component 3 is an air conditioner) are clearly shown. For each of the electrical components 1 to 3, the availability is shown as "available" or "unavailable", and the available time is shown for each of the electrical components 1 to 3. Incidentally, here, the availability for each of the electrical components 1 to 3 indicates whether or not each of the electrical components 1 to 3 can be continuously used (operated) in travel from the current location to the destination. That is, when the availability of one of the electrical components 1 to 3 is "available", it indicates that it is possible to continuously use this electrical component in travel to the destination. Further, when the availability of one of the electrical components 1 to 3 is "unavailable", it indicates that it is impossible to continue operation of this electrical component all the way to the destination.

For example, in the example shown in FIG. 4A, it is clearly shown that the audio unit (electrical component 1) can be continuously operated in completing travel to the destination, and that the time available for use of this audio unit is 30 minutes. Incidentally, since it is clearly shown that the audio unit can be continuously used until reaching the destination, the 30 minutes of available time is longer than the travel time to the destination. Regarding the cool box and the air conditioner (electrical components 2, 3), it is clearly shown that they cannot continue to be operated all the way to the destination. It is also shown clearly that the continuous available time is 20 minutes and 1 minute, respectively, if the electrical components continue to be operated.

By viewing the above-described display, the user can identify which electrical components are available for use and which are unavailable (or a maximum available time for each) when attempting to reach the destination by EV traveling using the rechargeable battery 46. Accordingly, by traveling according to this information, it is possible for the user to arrive at the destination in the EV mode (without using the internal combustion engine 44). Particularly for plug-in hybrid vehicles, it is often assumed that the rechargeable battery is recharged at a charging facility nearby such as a home, for repeat trips of relatively short distance in the EV mode, so as to minimize fuel consumption by the internal combustion engine as far as possible. Therefore, when this embodiment is applied to a plug-in hybrid vehicle, it is possible to notify to the user of an available electrical component and an unavailable electrical component, for allowing traveling by the power in the rechargeable battery without operating the internal combustion engine. Thus, the convenience of use of the plug-in hybrid vehicle can be enhanced.

(3) Other Embodiments

The above embodiment is one example for implementing the present invention. Various other embodiments can be adopted as long as they notify the user of information indicating the availability of electrical components of the vehicle while traveling a predetermined section, based on the excess power amount in a rechargeable battery. For example, in the above embodiment, application to a hybrid vehicle is described, but may also be applied to communicate to the user the information indicating the availability of electrical components in an electric vehicle or the like.

Further, when obtaining the required amount of power, it is sufficient to determine the amount of power required for traveling a predetermined section based on the electric power needed by the drive source of the vehicle, excluding power not contributing to operation of the drive source of the vehicle (power consumed by the auxiliary electrical devices). Various techniques can be adopted for calculation of this required amount of power, instead of the above-mentioned equation of motion. For example, the rotary speed and torque of the transfer shaft of the vehicle may be obtained by actual measurement, so as to calculate the required power amount. Furthermore, the predetermined section may be any section between two arbitrary points which the vehicle may travel from the present point in time, for example, a section (link or the like) set between two arbitrary points on the above-described guidance route.

Moreover, the current amount of power remaining in the rechargeable battery can be obtained as various parameters related to the rechargeable battery and corresponding to the remaining power amount. Instead of SOC, the remaining power amount may be determined by voltage, current, pH of the electrolyte, or the like. The excess power amount is that amount of power available for use other than that required by the drive source of the vehicle in travel of the predetermined section ("required power amount"). Therefore, when it is possible to increase the remaining amount of power by regeneration, as in a hybrid vehicle, the amount of power to be added by regeneration while traveling a predetermined section is estimated. When the amount of power to be added is recharged in the rechargeable battery, then that added amount of power can be used for other than operation of the drive source of the vehicle and is added to the excess power amount.

Further, one or a combination of the above-described remaining power amount, required power amount, and the excess power amount may be determined again every time the route is changed. Incidentally, in a hybrid vehicle, when the vehicle is diverted from a driving plan due to, for example, a traffic jam, the power amount to be charged by regeneration will change and it is preferable to once again determine one or a combination of the above-described remaining power amount, required power amount, and excess power amount for a new operation plan.

The information indicating the availability indicates directly or indirectly that one or more electrical components are available or unavailable for use during travel of a predetermined section. Therefore, various modes of notification can be adopted. For example, while in FIG. 4A the information identifies the electrical components by name, the electrical components may instead (or additionally) be shown as icons.

Further, the information indicating the availability of the electrical components may be displayed or announced in association with a predetermined section. For example, it may be communicated that "electrical component X is available until reaching the destination" or the like. Further, the user may be notified that travel of a predetermined section can be completed with the power remaining in the rechargeable battery when a certain electrical component is not used within the predetermined section, such as a communication "traveling to the destination is possible if electrical component X is not used". Furthermore, the user may be notified that the power remaining in the rechargeable battery will be insufficient if a certain electrical component is used in a predetermined section, such as an announcement "the remaining amount of power will be exhausted in the middle of the predetermined section" when a certain electrical component X is used. Furthermore, in the case of a hybrid vehicle, an announcement of power to be charged by regeneration may be made. For example, "power can be regenerated even when electrical component X is used until point Y".

Furthermore, a predicted transition in the amount of excess power may be announced. For example, assuming that the currently used electrical component will continue to be used from the present moment, it is possible to identify a predicted transition in the excess power by subtracting the amount of power consumption by the electrical component at various future points in time from the excess power amount. Accordingly, when the predicted transition of the excess power amount is communicated, it is possible for the user to identify when the excess power amount will become insufficient when the currently used electrical component continues to be operated from the present moment. In this manner, it is possible to indirectly advise the user of the availability of this electrical component while traveling the predetermined section.

FIG. 4B shows an example of a screen (screen 48b) for notifying the user of a predicted transition of the excess power amount. This screen 48b shows transition of the excess power amount in a graph with the abscissa being time and the ordinate on the right side being the amount of excess power. That is, in this graph, the center of the abscissa is the current time, the left side is the past, and the right side is the future. A history of the amount of excess power is denoted by a solid line, and the predicted transition of the excess power amount is denoted by a dashed line. Incidentally, the history of the excess power amount can be created by saving the value obtained in S115 of FIG. 2 each time this step is executed. Further, FIG. 4B shows the power consumption of the electrical component together with the excess power amount. That is, the ordinate on the left side denotes power, indicating the power consumption of the electrical component by a bar graph. The current power consumption (the bar colored black) denotes the power consumption of the currently used electrical component, and the future power consumption (the bar colored white) denotes the same power consumption value as the power consumption of the currently used electrical component. With this display, it is clearly shown that the transition of the excess power amount denoted by the dashed line is the transition of the excess power amount when the currently used electrical component continues to be operated. The power consumption by the electrical component in the past is shown by hatching.

Further, the user may be notified of an electrical component which can continue to be operated by the excess power amount while traveling the predetermined section (the travel of the predetermined section can be completed even if this component continues to be used). FIG. 5A shows an example of a screen (48c) notifying the user of an electrical component which can continue to be operated by the excess power, based on the priority set in advance for plural electrical components.

In FIG. 5A, the priority is set in order of the air conditioner, the audio unit, and the cool box. A combination of the electrical components is made in order from the electrical component with the highest priority, and the user is informed whether or not all the electrical components included in the combination can continue to be operated by the excess power amount. For example, for the air conditioner with the first priority, it is determined whether or not the air conditioner can continue to be operated while traveling a predetermined section. The result thereof is shown as "available" or "unavailable" ("available" in the example shown in FIG. 5A).

Further, for the audio unit with the second priority, use in combination with the air conditioner with the first priority is assumed. Specifically, it is determined whether or not both the audio unit and the air conditioner can continue to be operated by the excess power amount, and the result thereof is shown as "available" or "unavailable". In the example shown in FIG. 5A, there is shown "available", and this means that both the audio unit and the air conditioner can continue to be operated while traveling the predetermined section.

Further, in FIG. 5A, "unavailable" is shown for the cool box with the third priority, and this means that the remaining power amount in the rechargeable battery 46 will be insufficient to travel the predetermined section while operating all of the air conditioner, the audio unit, and the cool box. With the above arrangement, it is possible to clearly show the user how many electrical components, in order of priority, can be operated with the excess power amount when traveling a predetermined section. Incidentally, the priority may be determined, for example, by the user in advance, or the priority may be given in order beginning with the electrical component having the highest frequency of use. The priority may be defined in advance to vary depending on the season, time, or the like. For example, the air conditioner is given highest priority in the summer.

Alternatively, a combination of plural electrical components may be selected by the user, and information indicating the availability while traveling a predetermined section displayed. Specifically, the system is adapted to accept arbitrary selection of electrical components by the user, and to notify the user whether or not all the electrical components included in the selected combination are available throughout travel of a predetermined section. Screen 48d in FIG. 5B, shows whether or not the electrical components identified in rectangles can continue to be operated during travel of a predetermined section, as denoted by colors of the rectangles. In this example, a white rectangle indicates an available component, and a hatched rectangle indicates an unavailable component. This arrangement enables the user to select an available electrical component while traveling a predetermined section. Incidentally, as information indicating the availability for a combination of plural electrical components selected by the user, information indicating the availability for all combinations may be displayed, along with information on the availability of a portion thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A travel support system for a vehicle, comprising:
a required power amount obtaining unit obtaining a required power amount as an amount of power required of a rechargeable battery for travel of a route from a current location of the vehicle to a destination using only the rechargeable battery as a power source;
a remaining power amount obtaining unit obtaining a remaining power amount as the amount of power currently remaining in the rechargeable battery;
an excess power amount obtaining unit obtaining an excess power amount as a portion of the remaining power amount in the rechargeable battery in excess of the required power amount; and
a communication unit notifying a user of the vehicle of availability information indicating the availability for use of one or more auxiliary electrical devices of the vehicle in traveling the route from the current location to the destination, based on the excess power amount.

2. The travel support system according to claim 1, wherein the communication unit notifies the user of a name and available time for operation of the auxiliary electrical device.

3. The travel support system according to claim 2, wherein:
the excess power amount obtaining unit obtains a predicted transition of the excess power amount, the predicted transition being in continuing operation of a currently operated auxiliary electrical device; and
the communication unit informs the user of the predicted transition of the excess power amount.

4. The travel support system according to claim 3, wherein:
the communication unit notifies the user of an auxiliary electrical device which may be continuously operated on the excess power throughout travel of the route.

5. The travel support system according to claim 3, wherein:
the availability information indicates the availability of a combination of a plurality of the auxiliary electrical devices selected by the user for operation throughout travel of the route.

6. The travel support system according to claim 2, wherein:
the communication unit notifies the user of an auxiliary electrical device which may be continuously operated on the excess power throughout travel of the route.

7. The travel support system according to claim 6, wherein the availability information indicates the availability of a combination of a plurality of the auxiliary electrical devices selected by the user for operation throughout travel of the route.

8. The travel support system according to claim 2, wherein: the availability information indicates the availability of a combination of a plurality of the auxiliary, electrical devices selected by the user for operation throughout travel of the route.

9. The travel support system according to claim 1, wherein: the availability information indicates the availability of a combination of a plurality of the auxiliary electrical devices selected by the user for operation throughout travel of the route.

10. The travel support system according to claim 1, wherein:
the excess power amount obtaining unit obtains a predicted transition of the excess power amount, the predicted transition being in continuing operation of a currently operated auxiliary electrical device; and
the communication unit informs the user of the predicted transition of the excess power amount.

11. The travel support system according to claim 10, wherein:
the communication unit notifies the user of an auxiliary electrical device which may be continuously operated on the excess power throughout travel of the route.

12. The travel support system according to claim 11, wherein:
the availability information indicates the availability of a combination of a plurality of the auxiliary electrical devices selected by the user for operation throughout travel of the route.

13. The travel support system according to claim 10, wherein:
the availability information indicates the availability of a combination of a plurality of the auxiliary electrical devices selected by the user for operation throughout travel of the route.

14. The travel support system according to claim 1, wherein:
the communication unit notifies the user of an auxiliary electrical device which may be continuously operated on the excess power throughout travel of the route.

15. The travel support system according to claim 14, wherein:
the availability information indicates the availability of a combination of a plurality of the auxiliary electrical devices selected by the user for operation throughout travel of the route.

16. The travel support system according to claim 1, wherein:
the one or more auxiliary vehicle devices include at least one of an audio unit, an air conditioner and a cool box.

17. A travel support method for a vehicle having an electric motor for driving drive wheels of the vehicle and a rechargeable battery for providing power to the motor, comprising the steps of:
utilizing a computer, determining a current location of the vehicle;
utilizing a computer, determining a required power amount required of the rechargeable battery for travel of a route from the determined current location of the vehicle to a destination using only the rechargeable battery as a power source;
utilizing a computer, determining a current remaining power amount as an amount of power currently remaining in the rechargeable battery;
utilizing the computer, determining an excess power amount as a portion of the remaining power amount in the rechargeable battery in excess of the required power amount; and
utilizing a communication unit, notifying a user of the vehicle of information indicating the availability of one or more auxiliary electrical devices of the vehicle in traveling the route from the current location to the destination, based on the excess power amount.

18. The travel support method according to claim 17, wherein:
the one or more auxiliary vehicle devices include at least one of an audio unit, an air conditioner and a cool box.

19. A travel support program encoded on a non-transitory computer-readable medium, the program causing a computer to execute the functions of:
determining a required power amount required of a rechargeable battery for travel of a route from a current location of the vehicle to a destination using only the rechargeable battery as a power source;
determining a current remaining power amount as an amount of power currently remaining in the rechargeable battery;
determining an excess power amount as a portion of the remaining power amount in the rechargeable battery in excess of the required power amount; and
notifying a user of the vehicle of information indicating the availability of an auxiliary, electrical device of the vehicle in traveling the route from the current location to the destination, based on the excess power amount.

20. The travel support program encoded on a non-transitory computer-readable medium according to claim 19 wherein:
the one or more auxiliary vehicle devices include at least one of an audio unit, an air conditioner and a cool box.

* * * * *